US006993240B2

(12) United States Patent
Kashihara et al.

(10) Patent No.: US 6,993,240 B2
(45) Date of Patent: Jan. 31, 2006

(54) OPTICAL FIBER PROBE FOR DIAGNOSING COMBUSTION CONDITION IN A COMBUSTOR

(75) Inventors: Hiroyuki Kashihara, Kobe (JP); Takeo Oda, Kobe (JP); Yasuhiro Kinoshita, Kobe (JP)

(73) Assignee: Kawasaki Jukogyo Kabushiki Kaisha, Kobe-shi ( * ) Notice: Subject to any disclaimer, the term of this patent is extended or adjusted under 35 U.S.C. 154(b) by 0 days.

(21) Appl. No.: 10/743,099

(22) Filed: Dec. 23, 2003

(65) Prior Publication Data

US 2004/0161221 A1 Aug. 19, 2004

(30) Foreign Application Priority Data

Feb. 13, 2003 (JP) ............................ 2003-034637

(51) Int. Cl.
*G02B 6/00* (2006.01)

(52) U.S. Cl. ...................................................... 385/139

(58) Field of Classification Search ................ 385/139, 385/136, 137

See application file for complete search history.

(56) References Cited

U.S. PATENT DOCUMENTS

| | | | | |
|---|---|---|---|---|
| 4,537,193 A * | 8/1985 | Tanner | 606/4 |
| 4,776,827 A * | 10/1988 | Greaves | 374/161 |
| 5,774,610 A * | 6/1998 | O'Rourke et al. | 385/52 |
| 5,943,460 A * | 8/1999 | Mead et al. | 385/81 |
| 6,726,360 B2 * | 4/2004 | Singh et al. | 374/130 |
| 2002/0138073 A1 * | 9/2002 | Intintoli et al. | 606/15 |

FOREIGN PATENT DOCUMENTS

JP U 4-98010 8/1992

* cited by examiner

*Primary Examiner*—Chandrika Prasad
(74) *Attorney, Agent, or Firm*—Oliff & Berridge, PLC

(57) ABSTRACT

An optical fiber probe comprises an optical fiber, a first protective pipe holding the optical fiber therein for protection, and a collet attached to a front part of the first protective pipe. An adhesive is filled in a base part of the first protective pipe to form a sealing plug. The first protective pipe is formed in a length such that the base part of the first protective pipe is cooled by natural cooling at temperatures nearly equal to an ordinary temperature.

4 Claims, 4 Drawing Sheets

OPTICAL FIBER PROBE FOR DIAGNOSING COMBUSTION CONDITION IN A COMBUSTOR

BACKGROUND OF THE INVENTION

1. Field of the Invention

The present invention relates to an optical fiber probe and, more specifically to an optical fiber probe having high heat resistance and high pressure tightness.

2. Description of the Related Art

Combustion condition in a combustor, such as a gas turbine combustor, is diagnosed on the basis of the luminance of flames measured with an optical fiber probe during combustion, and combustion is controlled on the basis of the result of diagnosis. Optical fiber probes are exposed to high temperatures in measuring the luminance of flames, and hence the optical fiber probes are cooled by forced cooling using cooling water or cooling air. Thus, water-cooled optical fiber probes and air-cooled optical fiber probes are used.

A flame luminance measuring device using a water-cooled optical fiber probe needs a cooling water circulating system for circulating cooling water through the water-cooled optical fiber probe. Therefore, the flame luminance measuring device inevitably has complicated construction and is heavy. The heaviness of the flame luminance measuring device is a fatal disadvantage of the flame luminance measuring device using a water-cooled optical fiber probe, when the luminance measuring device is applied to an aircraft gas turbine combustor. The water circulating system needs additional driving power, increases the running cost of the flame luminance measuring device, and requires troublesome maintenance work.

A flame luminance measuring device using an air-cooled optical fiber probe inevitably has problems, though not as serious as those of the flame luminance measuring device using a water-cooled optical fiber probe, arising from the intricacy of construction, large weight, high running cost and the troublesomeness of maintenance work. If air supplied from a compressor is used as cooling air, the efficiency of the gas turbine decreases.

FIG. 4 shows a heat-resistant terminal structure for an optical fiber probe proposed in JP 4-98010 U to solve problems in water-cooled and air-cooled optical fiber probes. The heat-resistant terminal structure comprises, a bare optical fiber 101, a ceramic collet 102, a protective metal pipe 103, and a tip holder 104 holding a tip part of the bare optical fiber 101 adhesively bonded thereto in the ceramic collet 103. Since the optical fiber 101 and the ceramic collet 102 have different coefficients of thermal expansion, respectively, the holder 104 is unable to hold a sufficiently long tip part of the optical fiber 101. Consequently, the heat-resistant terminal structure has insufficient pressure tightness. The heat-resistant terminal structure needs an expensive adhesive for bonding the tip part of the optical fiber 101 to the holder 104.

SUMMARY OF THE INVENTION

The present invention has been made in view of the foregoing problems in the prior art and it is therefore an object of the present invention to provide an optical fiber probe requiring an adhesive having low heat resistance, and having high heat resistance and high pressure tightness.

According to the present invention, an optical fiber probe comprises: an optical fiber, a first protective pipe holding the optical fiber therein for protection, and a collet attached to a front part of the first protective pipe; wherein an adhesive is filled in a base part of the first protective pipe to form a sealing plug.

In the optical fiber probe according to the present invention, it is preferable that the optical fiber is able to extend relative to the collet.

Preferably, the optical fiber probe according to the present invention further comprises a second protective pipe covering the optical fiber and fitted in the first protective pipe.

In the optical fiber probe according to the present invention, it is preferable that the first protective pipe is formed in a length such that the base part of the first protective pipe is cooled by natural cooling at temperatures nearly equal to an ordinary temperature.

Even though the adhesive has low heat resistance, the optical fiber probe of the present invention thus constructed has high heat resistance and pressure tightness.

Since the optical fiber is movable relative to the collet, damaging the optical fiber due to the difference in thermal expansion between the optical fiber and the protective pipe can be avoided.

BRIEF DESCRIPTION OF THE DRAWINGS

The above and other objects, features and advantages of the present invention will become more apparent form the following description taken in connection with the accompanying drawings, in which.

DESCRIPTION OF THE PREFERRED EMBODIMENTS

Figure 1:
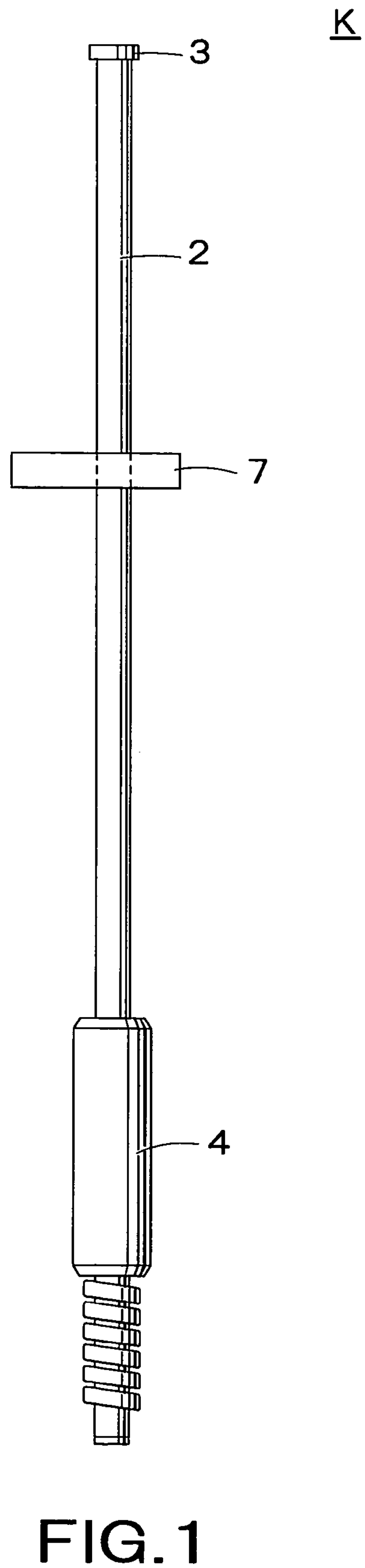
FIG. 1 is a schematic front elevation of an optical fiber probe in a preferred embodiment according to the present invention.
Figure 2:
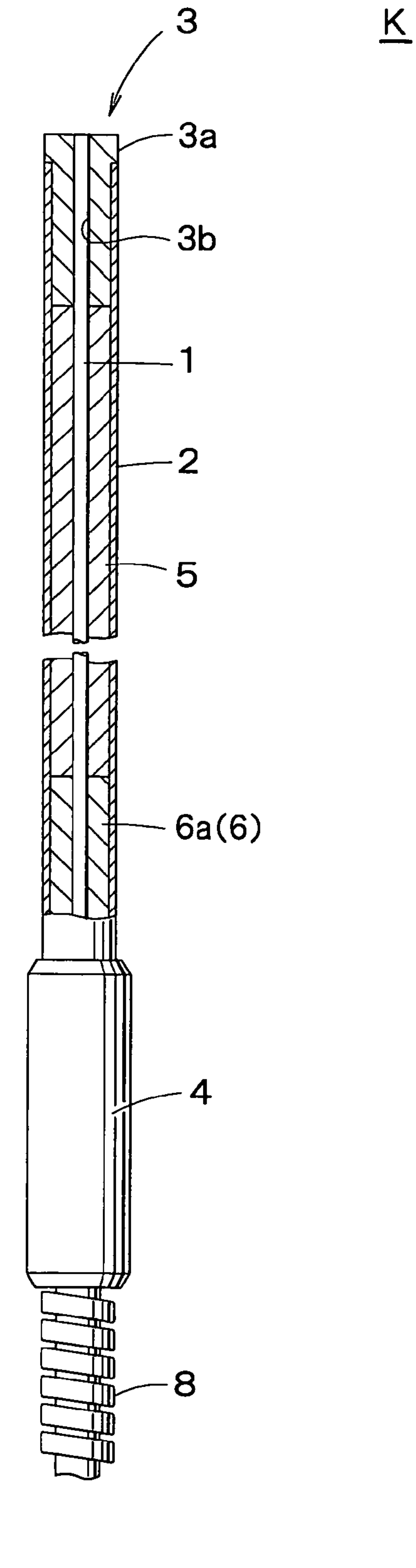
FIG. 2 is a longitudinal sectional view of the optical fiber probe shown in FIG. 1.

Referring to FIGS. 1 and 2, an optical fiber probe (hereinafter referred to simply as "probe") K in a preferred embodiment according to the present invention comprises an optical fiber 1, a sheathing pipe (first protective pipe) 2 covering the optical fiber 1 for protection, a collet 3 fitted in a tip part of the sheathing pipe 2, and a base member 4 connected to a base part of the sheathing pipe 2. The optical fiber 1 is coated with a metal coating, such as a gold coating, to improve the heat resistance of the optical fiber 1. The sheathing pipe 2 is a heat-resistant steel pipe, such as a stainless steel pipe. A ceramic protective pipe (second protective pipe) 5 for protecting the metal coating covers the optical fiber 1. An adhesive is filled in a base part of the sheathing pipe 2 to form a sealing plug 6. The sheathing pipe 2 is formed in a length such that the base part of the sheathing pipe 2 is cooled by natural cooling to a temperature nearly equal to an ordinary temperature. A holder 7 for fixedly holding the probe K on the wall of a combustion chamber or a wall of a high-pressure vessel is attached to a part of the sheathing pipe 2.

As shown in FIG. 2, the ceramic protective pipe 5 has a front end in contact with the back end of the collet 3 and the other end in contact with the front end of the sealing plug 6. The optical fiber 1 is extended through the bore of the ceramic protective pipe 5. The ceramic protective pipe 5 has an inside diameter slightly greater than the diameter of the optical fiber 1 so that the metal coating covering the optical fiber may not be rubbed off in passing the optical fiber through the bore of the ceramic protective pipe 5, and an outside diameter slightly smaller than the inside diameter of the sheathing pipe 2 so that the ceramic protective pipe 5 can be fitted in the sheathing pipe 2.

As shown in FIG. 2, the sealing plug 6 is formed in a predetermined length by filling an adhesive in a portion of the base part of the sheathing pipe 2. The length of the sealing plug 6 of the adhesive 6*a* is dependent on required pressure tightness. When the withstand pressure is, for example, on the of 4 MPa, the length of the sealing plug 6 is in the range of about 20 to about 30 mm. Since the sealing plug 6 is cooled at temperatures nearly equal to an ordinary temperature, the adhesive 6*a* does not need to be heat-resistant. The adhesive is, for example, an epoxy adhesive.

The collet 3 is formed of a heat-resistant material, such as a stainless steel. The collet 3 is formed in a stepped cylinder having a flange 3*a* seated on the front end of the sheathing pipe 2, and provided with a central bore 3*b*. The collet 3 is fitted in the sheathing pipe 2 with the flange 3*a* seated on the front end of the sheathing pipe 2, and is fastened to the sheathing pipe 2 by staking an end part of the sheathing pipe 2. The diameter of the bore 3*a* of the collet 3 is determined so that the difference in thermal expansion between the optical fiber 1 and the sheathing pipe 2 may not obstruct the extension of the optical fiber 1 relative to the sheathing pipe 2.

Figure 3:
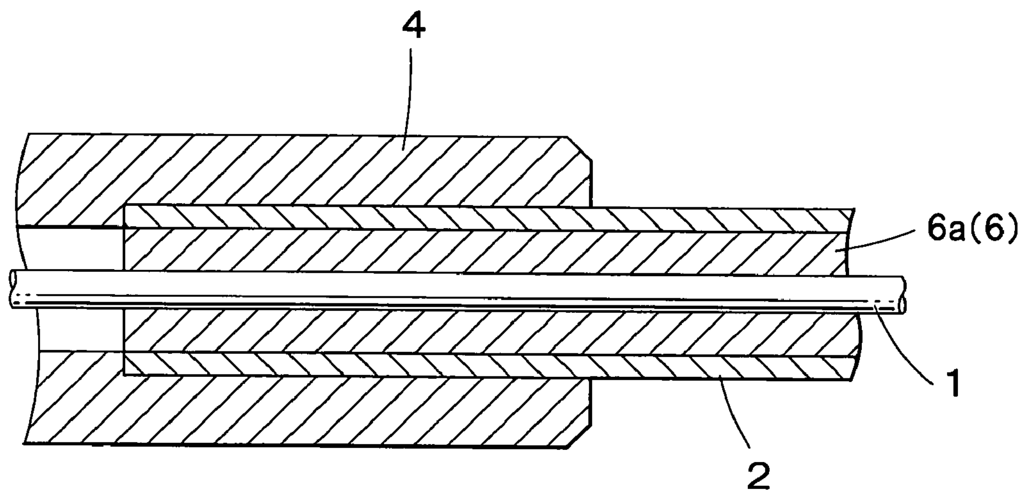
FIG. 3 is a longitudinal sectional view of a base part of the optical fiber probe shown in FIG. 1.
Figure 4:
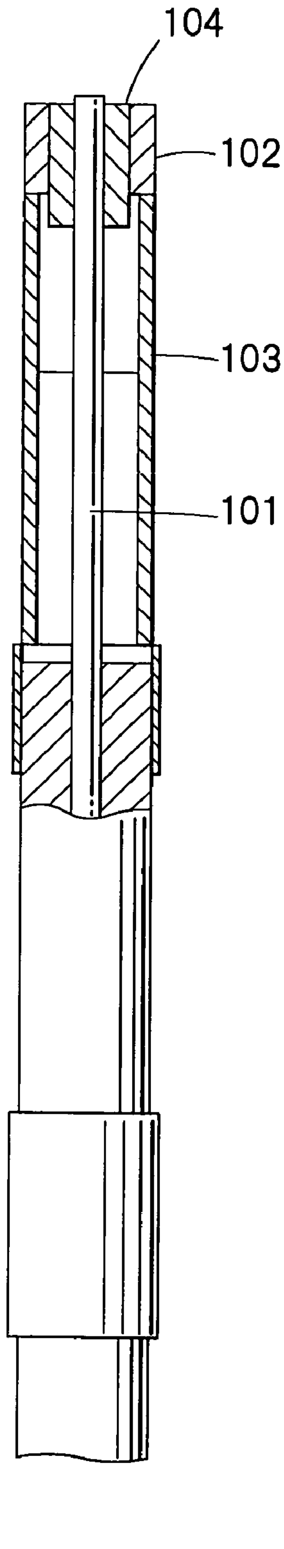
FIG. 4 is a longitudinal sectional view of a prior art optical fiber probe disclosed in a cited reference.

The base member 4 is, for example, a stainless steel pipe. As shown in FIG. 3, a base part of the sheathed pipe 2 is fitted in a front part of the base member 4, and a flexible tube 8 is connected to the back end of the base member 4. The optical fiber 1 extended in the sheathed pipe 2 is connected to an optical fiber, not shown, extended in the flexible tube 8. The optical fiber 1 may be extended through both the sheathing pipe 2 and the flexible tube 8.

A method of fabricating the probe K will be described. the ceramic protective pipe 5 covering the optical fiber 1 is fitted in the sheathing pipe 2. The collet 3 is fitted in front part of the sheathing pipe 2 so that the flange 3*a* is seated on the front end of the sheathing pipe 2, and the front end of the sheathing pipe 2 is staked to fasten the collet 3*a* to the sheathing pipe 2. Then, the adhesive 6*a* is filled in the base part of the sheathing pipe 2 to form the sealing plug 6. then, the base part of the sheathing pipe 2 is fitted securely in the base member 4 to complete the probe K.

Although the sealing plug 6 is formed of the adhesive 6*a* having low heat resistance, the sealing plug 6 is capable of withstanding high pressure because the sealing plug 6 is formed in the base part, that will be cooled at temperatures nearly equal to an ordinary temperature, of the sheathing pipe 2. Since the sealing plug 6 can be formed simply by filling the adhesive 6*a* having low heat resistance in the base part of the sheathing pipe 2, the probe K can be easily fabricated at a low cost.

Since the optical fiber 1 is able to extend relative to the collet 3, the optical fiber 1 is able to extend freely when heated without being damaged by frictional resistance against the thermal expansion thereof. Since the optical fiber 1 protected by the ceramic protective pipe 5 is extended in the sheathing pipe 2, the metal coating will not come off and the deterioration of the heat resistance of the optical fiber 1 due to the separation of the metal coating from the optical fiber 1 can be prevented.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An optical fiber probe for diagnosing a combustion condition in a combustor, comprising:

an optical fiber;

a first protective pipe holding the optical fiber therein for protection, the first protective pipe having a front part and a base part, and the first protective pipe being formed in a length such that the base part of the first protective pipe is cooled by natural cooling at temperatures substantially equal to an ordinary temperature; and a collet attached to the front part of the first protective pipe;

wherein an adhesive is filled in the base part of the first protective pipe to form a sealing plug, and the optical fiber is movable relative to the collet during diagnosis of the combustion condition.

2. The optical fiber probe according to claim 1 further comprising a second protective pipe covering the optical fiber and fitted in the first protective pipe.

3. The optical fiber probe according to claim 1, wherein the optical fiber and the collet are heat-resistant.

4. The optical fiber probe according to claim 1, wherein the optical fiber extends through the collet.

* * * * *